United States Patent [19]

Pankow

[11] Patent Number: 4,852,539
[45] Date of Patent: * Aug. 1, 1989

[54] SUPPLEMENTAL AIR VALVE FOR INTERNAL COMBUSTION ENGINE

[76] Inventor: Chester W. Pankow, 4220 E. Almeria, #B-4, Phoenix, Ariz. 85008

[*] Notice: The portion of the term of this patent subsequent to Dec. 29, 2004 has been disclaimed.

[21] Appl. No.: 131,666

[22] Filed: Dec. 11, 1987

Related U.S. Application Data

[63] Continuation-in-part of Ser. No. 900,088, Aug. 25, 1986, Pat. No. 4,715,351.

[51] Int. Cl.⁴ .......................................... F02M 123/04
[52] U.S. Cl. .................................. 123/587; 123/574; 137/480
[58] Field of Search ...................... 123/41.86, 572–574, 123/585, 587; 137/479, 480

[56] References Cited

U.S. PATENT DOCUMENTS

| | | | |
|---|---|---|---|
| 3,494,339 | 2/1970 | Fernandez et al. | 123/573 |
| 3,809,035 | 5/1974 | Winton | 123/574 X |
| 3,946,710 | 3/1976 | Albano et al. | 123/573 |
| 3,967,605 | 7/1976 | Dolfi, Sr. | 123/574 |
| 4,210,113 | 7/1980 | Heffernan | 123/587 X |
| 4,715,351 | 12/1987 | Pankow | 123/587 |

*Primary Examiner*—Tony M. Argenbright
*Assistant Examiner*—Eric R. Carlberg
*Attorney, Agent, or Firm*—Gregory J. Nelson

[57] ABSTRACT

An air metering valve or supplemental air valve connectable in the PCV system of an internal combustion engine having a shiftable valving member which regulates the quantity of supplemental air introduced into the PCV return. The valve spool is spring biased to the open position by a calibration spring. Pressure chambers are formed on opposite sides of the actuating pistona nd connectable to engine vacuum sources. As the degree of vacuum varies in the vacum sources, the valve spool shifts between an open and closed position. The valve may also be used to provide supplemental ambient combustion air under vacuum control independent of the PCV system. In another embodiment of the invention, the major valve components such as the valve body and shiftable valving member are fabricated from suitable plastic materials.

4 Claims, 4 Drawing Sheets

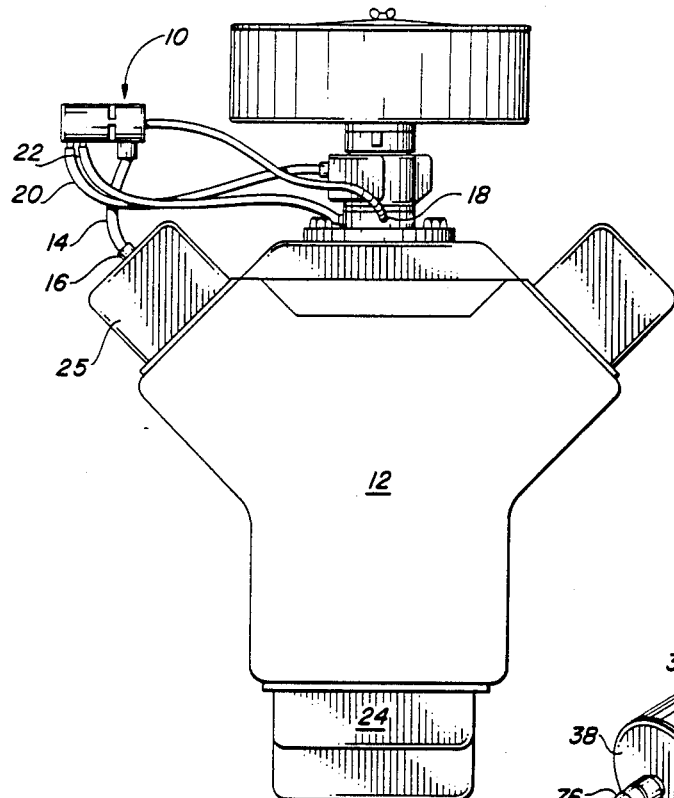
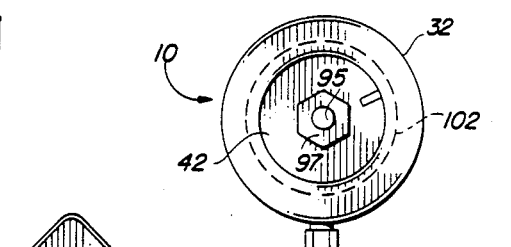
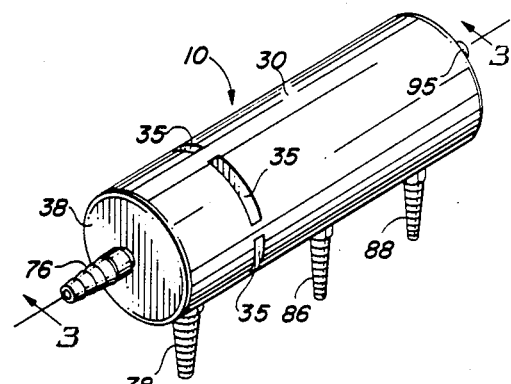
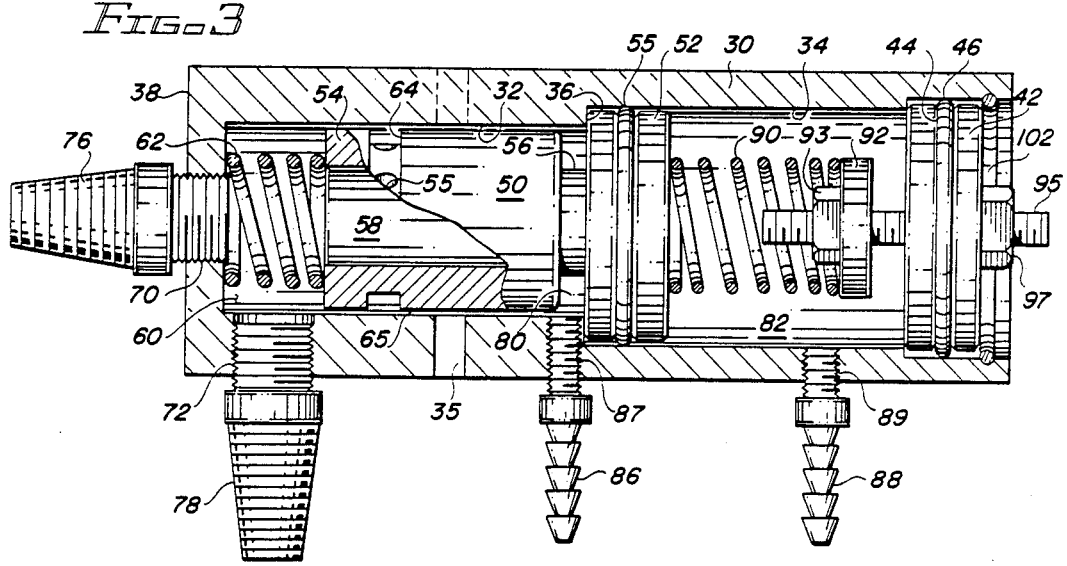

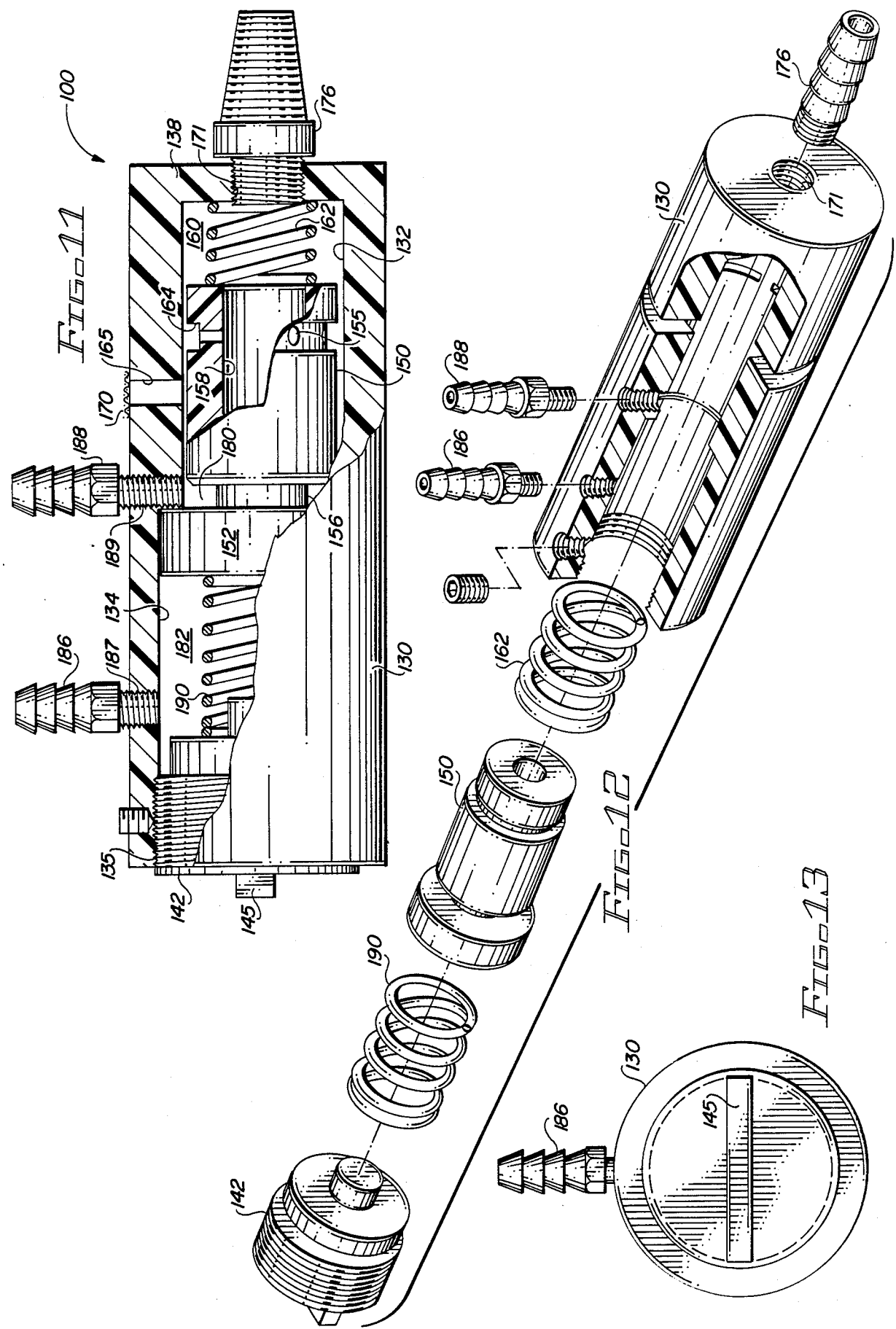

SUPPLEMENTAL AIR VALVE FOR INTERNAL COMBUSTION ENGINE

This is a continuation-in-part of application Ser. No. 06/900,088, filed Aug. 25, 1986 now U.S. Pat. No 4,715,351, entitled "Supplemental Air Valve For Internal Combustion Engine".

The present invention relates to a device for automatically controlling the addition of supplemental air to an internal combustion engine and more particularly relates to a valve for automatically controlling the addition of supplemental air to the air and blow-by gases returned to the engine through the positive crank case ventilation (PCV) system or for providing supplemental air at the intake manifold.

In the conventional aspirated internal combustion engine, the air/fuel mixture (A/P) is controlled and supplied to the engine by a carburetor mounted upon the intake manifold. The carburetor defines a bore for passage of air through the carburetor and communicates with the individual cylinders through the intake valves and the intake manifold. A venturi section and throttle valve are located in the bore. As air passes through the bore, fuel is entrained into the air stream from the fuel supply.

The opening in the bore and the volume of air which may pass through the bore is controlled by the throttle valve. The throttle valve is generally connected to a throttle lever to manually operable means such as the accelerator pedal, located in the driver's compartment.

In the normal operation of the vehicle, force applied to the throttle, generally by the foot of the vehicle operator, actuates the linkage which opens the throttle valve to allow more air to flow through the carburetor bore. The movement of air through the bore is in response to the vacuum created within the cylinders during the intake portion of the cycle. The increased flow of air through the venturi, in accordance with the Bernoulli principle, causes more air to flow into the air stream.

During engine operation, the pressure within the intake manifold is negative and usually measured in inches of mercury. The amount of intake vacuum varies inversely with engine speed and for a typical engine may equal up to twenty inches of mercury during engine start-up and reduce to one or one-and-a-half inches of mercury at cruising speed.

It is well known in the automotive industry to increase engine efficiency by admitting supplemental air flow to the intake manifold to increase combustion efficiency. Conventional engines will burn less than all of the fuel supply due primarily to insufficient oxygen available to support combustion. The inability of engines to completely combust available fuel is aggravated by systems which recycle blow-by gases to the air fuel stream as is currently the practice to reduce air pollution.

A certain quantity of blow-by gases generally collect in the crank case. Blow-by gases include carbon dioxide, carbon monoxide, hydrocarbons, and some particulate matter and oil. Positive crank case ventilation removes air and blow-by fumes from the crank case of the engine by drawing filtered ambient air through the crank case to the pollution control valves (PCV) which is usually located on one of the engine valve covers and is spring biased and pressure operated. The recycled fumes or blow-by gases are introduced into the intake manifold. The addition of recycled fumes or blow-by gases tends to further reduce available oxygen for combustion.

Inclusion of PCV valves on engines is generally mandatory. EPA and other federal and state governmental regulatory agencies do not permit modifications or after-market accessories that materially change the operation of the PCV valve. Accordingly, any modifications to the PCV system must be designed to furnish less supplemental air at low speeds without a substantial change of air input at high speeds.

With the introduction of the PCV valve in the engine system, a number of supplemental air valve designs have been developed and can be found in the prior art. Most of these prior art supplemental air valves are simple check valve designs having a valve element connected to engine vacuum source to move in response to relative increased suction to decrease air delivery into the blow-by or crank case fume return.

Patents showing devices of this general type are shown in the U.S. Pat. Nos. 3,809,035 to Winton; No. 3,946,710 to Albano et al and No. 3,967,605 to Dolfi.

Briefly, the present invention provides an automatic supplemental air control for regulating the admission of supplemental oxygen containing air into the PCV return system or to the intake manifold. The valve is adapted to be inserted in the line between the PCV valve and the intake manifold. The supplemental air valve of the present invention is compatible with PCV systems to provide supplemental air at cruising and acceleration conditions without interfering with the operation of the PCV valve and without interfering with the operation of the vehicle carburetor. The supplemental air valve includes a body having a chamber which receives an axially slidable valve member. The valve member includes a piston defining opposite pressure chambers. One of the pressure chambers is connectable to one source of engine vacuum such as carburetor vacuum and the opposite valve chamber is connectable to another source of engine vacuum such as a manifold vacuum. An adjustable resilient member such as a compression spring biases the piston toward the valve closed position and the valve is opened under the influence of the pressure differential imposed on the piston by the opposed vacuum source. In the open position, air is admitted through the valve body and radial slots in the valve spool to an axial air passageway. The axial air passageway communicates with a valve chamber connectable to the PCV system. In the normal idle condition of the vehicle, the valve is closed. As engine speed is increased, the amount of vacuum measured at the intake manifold varies inversely with the engine speed and the amount of vacuum measured at the carburetor varies directly causing the differential pressure to be imposed across the piston moving the piston and associated valve body toward a valve open position.

Other objects and advantages of the present invention will become more apparent from the following specification, claims and drawings in which:

FIG. 1 is a front view of a typical automotive internal combustion engine with the installation of the valve of the present invention represented schematically in connection with the engine;

FIG. 2 is a perspective of the valve of the present invention;

FIG. 3 is a longitudinal sectional view taken along lines 3—3 of FIG. 2;

FIG. 3A is an end view as viewed from the right end of FIG. 3;

FIG. 11 is a side view of an alternate embodiment of the valve of the present invention partly broken away to better illustrate the internal components of the valve;

FIG. 12 is an exploded view partly in section illustrating the valve of FIG. 11; and FIG. 13 is an end view as viewed from the left end of FIG. 11.

Figure 4:
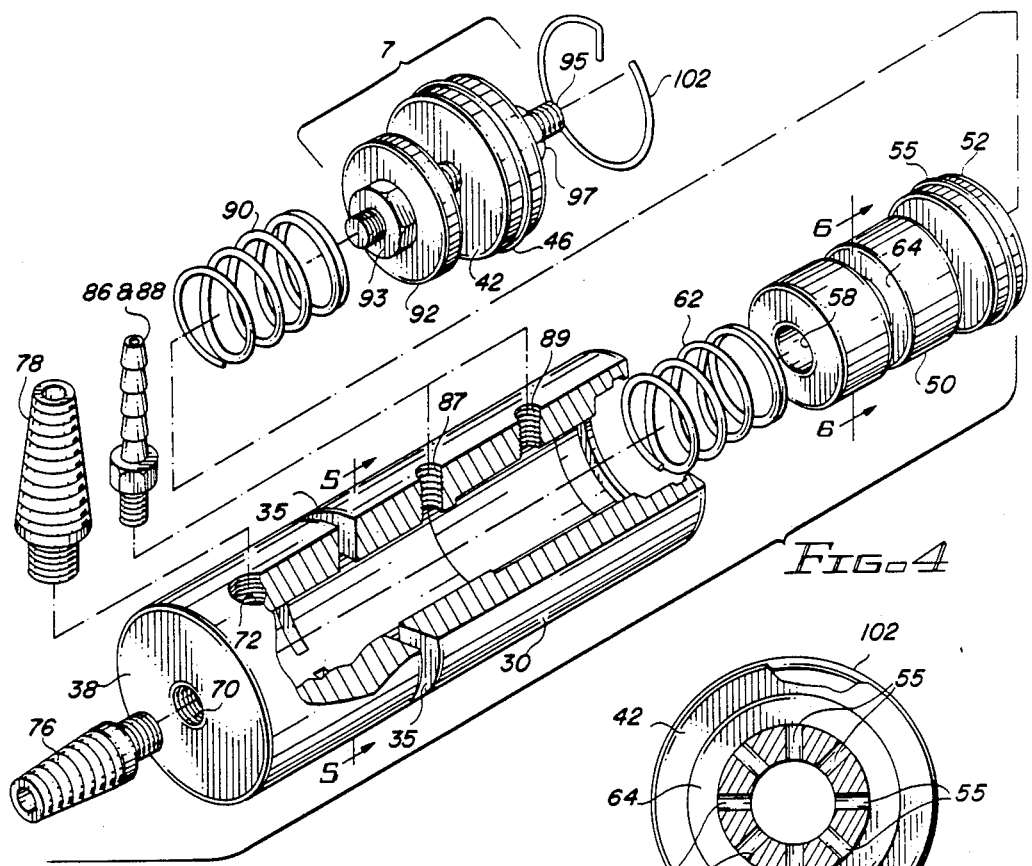
FIG. 4 is a perspective view of the valve of the present invention partly broken away to better illustrate the details of the air valve of the present invention.
Figure 6:
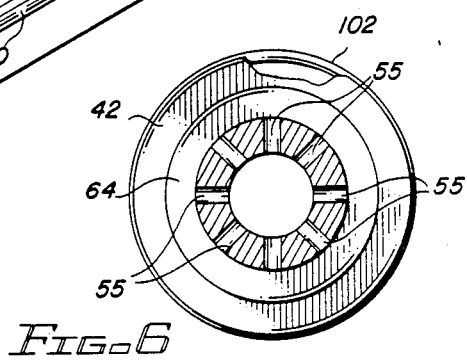
FIG. 6 is a sectional view taken along lines 6—6 of FIG. 4.
Figure 5:
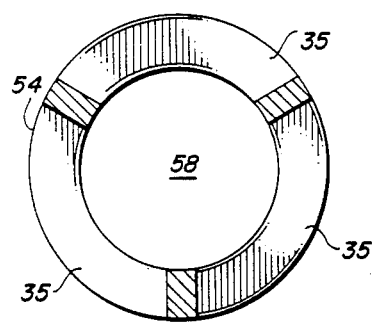
FIG. 5 is a sectional view taken along lines 5—5 of FIG. 4.

Turning now to the drawings, the valve of the present invention is generally designated by the numeral 10. In FIG. 1, air valve 10 is shown in connection with a conventional V-8 internal combustion engine 12. Valve 10 is installed in the PCV return line 14 extending between the PCV valve 16 and the intake manifold fitting 18. Valve 10 is connected to engine vacuum sources by vacuum lines 20 and 22 shown connected, respectively, to the carburetor and intake manifold at appropriate fittings.

Engine 12 is provided with an oil sump or reservoir 24 generally termed a crank case. Unburned gases and other materials which bypass the piston accumulate in the crank case 24 and these fumes and air return via line 14 to the intake manifold across the PCV valve 16. The PCV valve 16 provides maximum purging of the crank case to the input manifold at low speeds and reduces flow as engine speed increases. Generally crank case pressure is higher than input manifold pressure and this pressure differential is used to open the PCV valve 16 against a spring arranged to bias the valve closed. PCV valve 16 is conventionally mounted on the valve cover 25 as shown. The above described PCV system is conventional and is set forth as background to facilitate understanding the use and operation of the present invention.

The valve of the present invention is best shown in FIGS. 2 through 6. The supplemental air valve of the present invention includes a generally cylindrical housing or casing 30 having an inner axial bore 32. Increased diameter counter bore 34 extends to an intermediate location at shoulder 36. One end of the valve at bore 32 is closed by end section 38. Bore 34 is closed by circular end plate 42 which seats in annular groove 44. Elastomeric O-ring 46 seats in a circumferential groove about the closure 42 and provides a seal between the closure and interior housing wall 44. An appropriate snap ring 102 secures end plate 42 in position and is removable to provide access to the valve interior.

Valve member 50 is slidable within bores 32 and 34. Valve member 50 includes a cylindrical spool section 54 slidable within bore 32 and larger diameter piston 52 slidable within bore 34. The spool 54 and piston 52 are connected by axial shaft 56. Piston 52 is provided with a circumferential O-ring or other sealing member 55.

Valve spool 54 defines an axial air passageway 58 which is in open communication with flow chamber 60 at the left end of the valve. A helical compression assist spring 62 extends between valve end 38 and the inner end of spool section 54. An annular groove 64 extends around spool 58 defining a land section 65. A plurality of bores 55 extend radially in the valve spool communicating air passage 58 with annular groove 64. In the open position, groove 64 is in registry with air ports 35 spaced about valve body 30. A threaded bore 70 extends through valve end 38 communicating with air chamber 60. Similarly, a bore 72 extends through the cylindrical side wall adjacent end 38 communicating with flow chamber 60. A pair of fittings 76, 78 are in threaded engagement at bores 70 and 72 and communicate with flow chamber 60. The fittings 76, 78 have a tapered portion to connect to a hose or tubing. The supplemental air valve 10 of the present invention is installed by connecting the valve to the PCV line at fittings 76, 78, as will be explained hereafter.

Piston 52 subdivides counter-bore 34 into opposite pressure chambers 80 and 82. Radial bore 87 communicates with chamber 80. A fitting 86 is in threaded engagement in bore 87 to provide for attachment to a vacuum line. Similarly, bore 89 communicates with chamber 82 and fitting 88 is provided therein for convenient connection to a suitable vacuum source.

Resilient calibration means shown as helical spring 90 urges or biases piston 52 leftward to the closed position as shown in FIG. 3. Spring 90 is a helical compression spring extending in chamber 82 between piston 52 and adjustment disc 92. Adjustment disc 92 is secured to nut 93 which is in threaded engagement with axially extending stud 95. Stud 95 extends through a threaded concentric opening in closure 42. The outer surface of closure 42 carries threaded nut 97. The axial spacing between the closure 42 and adjustment disc 92 can be varied by turning nut 93 to advance or retract the disc along the stud 95. The effect is to accordingly increase or decrease the spring force exerted against piston 52.

The supplemental air valve of the present invention will be more fully understood and appreciated from the following description of operation. The supplemental air valve 10 is installed in the PCV hose extending from the PCV valve to the intake manifold. The valve is installed by severing the hose and connecting one severed section between the intake manifold and fitting 76 at the valve end. The other severed section connects the PCV valve to fitting 78.

Chambers 80 and 82 are connected to appropriate engine vacuum sources. For example, chamber 80 is connected to the intake manifold by connecting a suitable vacuum hose 22 to fitting 86. Chamber 82 is connected to a suitable vacuum hose source by hose 20 which connects to the carburetor. Snap ring 102 is removed and closure 42 can be extracted from the valve. The appropriate biasing force exerted by spring 90 will be set by adjusting disc 92 along stud 95. The precise setting of the biasing spring will vary with engine type, engine size and other characteristics The valve is reassembled with spring 90 and closure 42 and snap ring 102 locked in place. It will be apparent that the installation is simple. The valve 10 will not interfere with the normal operation of the PCV system since the travel of the valve member is limited by shoulder 36 maintaining an unobstructed flow path in the PCV system.

Normally manifold pressure varies inversely with engine speed. Carburetory vacuum tends to vary directly with engine speed. Accordingly, at engine idle, manifold vacuum is higher than the carburetor vacuum. Thus, a pressure differential is imposed across piston 52 causing the valve 50 to move leftward as seen in FIG. 3 assisted by spring 90. The leftward movement will position land 65 bridging radial air ports 35 preventing admission of air into chamber 60 and only the blow-by fumes will pas through chamber 60 to the intake manifold. Leftward travel of the valve 50 is limited at shoulder 36.

As engine speed is increased, carburetor vacuum will increase and manifold vacuum will decrease. As this occurs, the pressure differential across piston 52, aided by the biasing spring 93, will move the piston rightwardly as viewed in FIG 3. The rightward travel of the valve member 50 will place annular groove 64 in registry with air ports 35, radial bores 55 and axial air passageway 58 permitting ambient air to be induced into chamber 60. The air admitted is mixed with the flow of air and gases passing through the PCV system. At cruising speeds the valve will be in a partly open position admitting some supplemental flow of air and acceleration will open the valve to admit air. Some lag in the response of the valve is desirable as during deceleration and acceleration of the vehicle, the air/fuel mixture will become rich or lean for a short period until stability is reached.

The admission of supplemental air to support combustion is controlled by the position of the member 50 of the valve. The valve member 50 is pressure balanced and shifts in response to pressure chambers existing at the vacuum sources. Increases or decreases in intake manifold or carburetor vacuum levels will influence the valve causing additional air to be introduced into the PCV system during periods of acceleration without adversely affecting the operation of the PCV system. The air valve of the present invention can be calibrated or adjusted at spring 90 to accomodate various engine and operating characteristics. The pressure balanced valving member 50 continually and automatically shifts to regulate the admission of air as the vacuum sources fluctuate.

The valve of the present invention is simple, effective and reliable. Preferable, the valve is manufactured having an aluminum body. The valving member 50 can be either aluminum or a suitable heat resistant material. The installation of the valve takes only a few minutes and can be accomplished by the vehicle owner or a mechanic without the need for any special tools.

Figure 8:
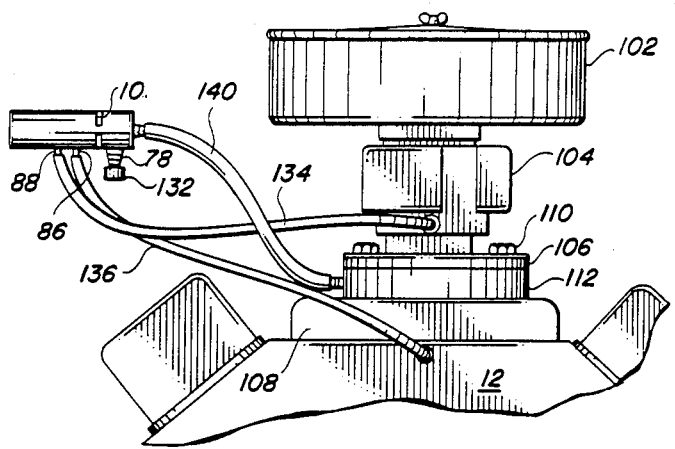
FIG. 8 illustrates the installation of the valve of the present invention with certain engines which require inclusion of an adaptor plate.
Figure 10:
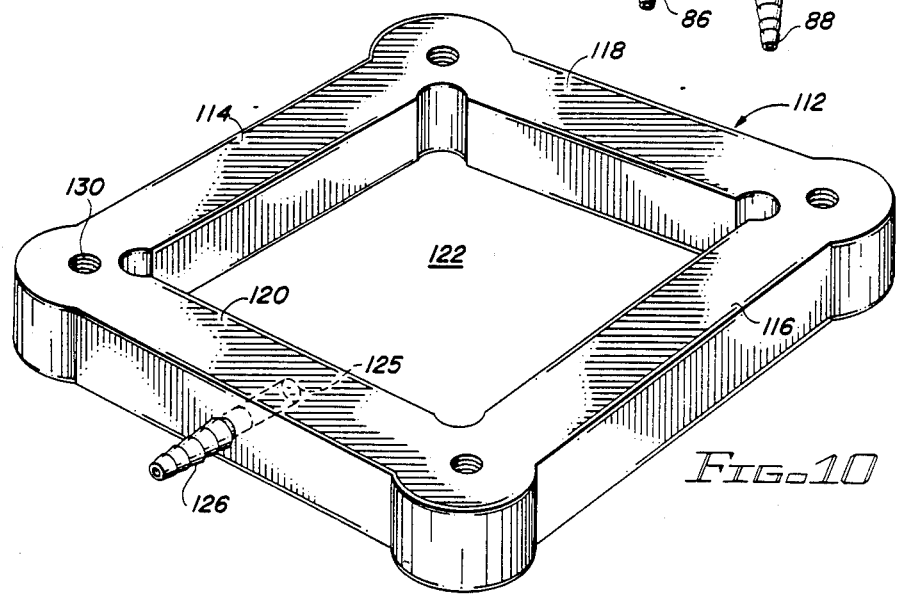
FIG. 10 is a perspective view of the mounting adaptor plate.

In certain instances, the valve of the present invention can be used to provide supplemental ambient combustion air to an engine independent of the PCV system. In FIG. 8 a conventional V-block engine 12 is shown. Air cleaner 102 is positioned on carburetor 104 to filter air drawn into the carburetor. Carburetor 104 is provided with a lower flange 106 which is secured to intake manifold 108 by mounting bolts 110. Adaptor plate 112 is interposed between carburetor flange 106 and intake manifold 108. Adaptor plate 112 is best seen in FIG. 10 and has opposite sides 114, 116 and ends 118, 120 forming a generally rectangular frame defining a central chamber 122. Bore 125 extends through end 120 and is provided with a fitting 126 for connection to a suitable air hose. Bore 125 communicates with the area or chamber 122. Bolt holes 130 are provided in the plate adapted to align with bolt holes in flange 106 of carburetor 104.

In use, the adaptor plate 112 is interposed between the carburetor flange 106 and intake manifold 108 and secured in place by bolts 110.

Figure 7:
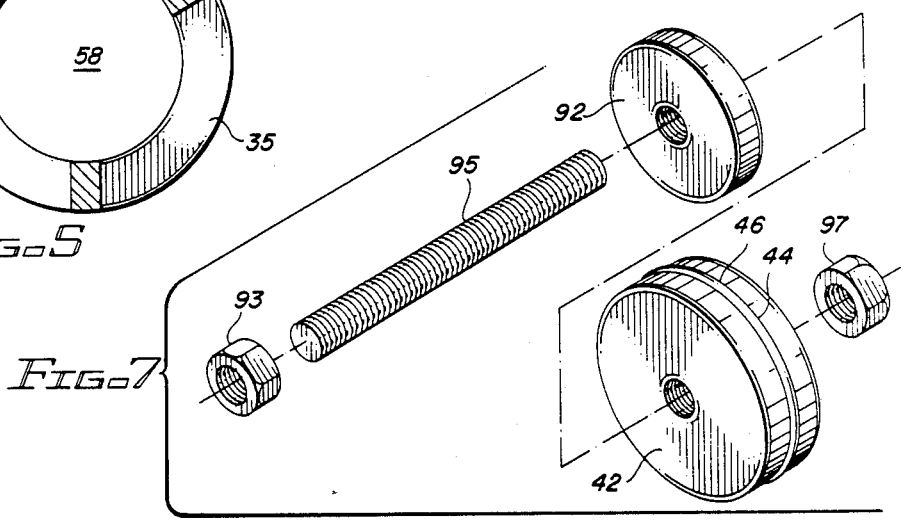
FIG. 7 is an exploded perspective view of the piston assembly.

In the event the air valve 10 of the present invention is to be used dependent of the PCV system, fitting 78 is blocked off by a suitable plug 132 as shown in FIG. 7. Fitting 76 is connected by an air hose 140 to fitting 126 on adaptor late 112. Fittings 86 and 88 are connected to engine vacuum sources such as carburetor vacuum and intake manifold vacuum by lines 134 and 136 as shown in FIG. 8.

The operation of the valve 10 is generally as has been described above with piston 52 being reciprocal under the influence of pressure differential imposed by the vacuum sources to shift to meter air into the intake manifold at the adaptor plate. The incoming air is introduced through the valve 10 at chamber 122 and is mixed with the air/fuel mixture introduced through carburetor 104. The air and fuel are intimately mixed to provide additional oxygen to support combustion within the engine.

Figure 9:
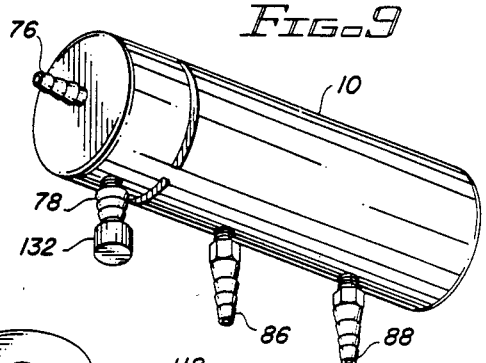
FIG. 9 is a perspective view of a modified form of valve of the present invention for certain installations.

The advantages of the system as shown in FIGS. 8 and 9 are that the installation does not involve the existing PCV system. PCV valves are known to occassionally foul 7 and not operate properly. If the PCV valve becomes inoperative, the operation of the valve 10 is not affected as air is introduced independent of the PCV valve.

FIGS. 11 through 13 show an alternate embodiment of the valve of the present invention. As seen in Those figures, the alternate embodiment is generally designated by the numeral 100 and includes a cylindrical housing or casing 130 having an inner axial bore 132. Increased diameter counter bore 134 extends to an intermediate location at shoulder 136. One end of the valve at bore 32 is closed by end section 138. At the opposite end of the valve, bore 134 defines internal threads 135. Externally threaded plug member 142 is in threaded engagement with threads 135. A projection 145 extends from plug 142 to facilitate rotation of the plug.

Valve spool 150 is slidable within bore 132 and bore 134. Valve member 150 includes cylindrical spool section 154 slidable within bore 132 and larger diameter piston 152 slidable within bore 134. The spool 154 and piston 152 are connected by an axial shaft 156. Valve spool 154 defines an axial air passageway 158 which is in open communication with flow chamber 160 at the right end of the valve which chamber is defined between end 138 and the right end of valve spool 154. A helical compression assist spring 162 extends between the valve end 138 and the inner side of spool section 154. An annular groove 164 extends around spool 158. A plurality of bores 155 extend radially in the valve spool communicating air passage 158 with annular groove 164. In the open position, groove 164 is in registry with valve ports 165 spaced about the valve body. A circumferential screen member 170 may be placed about the valve body at air ports 165 to screen or filter out larger particulate matter.

A threaded bore 171 extends through valve end 138 communicating with air chamber 160. Fitting 176 is in threaded engagement at bore 171 and communicates with internal chamber 160. As has been described above, the supplemental air valve 100 of the present embodiment is installed in a manner similar to the embodiment of the valve described above by connecting the valve to an adaptor plate or similar fitting located intermediate the carburetor and manifold by connecting a conduit to fitting 176.

Piston 152 sub-divides counterbore 134 into opposite pressure chambers 180 and 182. Radial bore 187 communicates with chamber 180. A fitting 186 is in threaded engagement in bore 187 to provide a means of attachment to a vacuum line communicating with chamber 182. Similarly, bore 189 communicates with chamber 180 and fitting 188 is provided for convenient connection of this chamber to a suitable vacuum source.

Resilient calibration means are shown as helical spring 190 which urges or biases piston 152 to the closed position which is rightward as viewed in FIG. 11. Spring 190 is a helical compression spring extending in chamber 182 between piston 152 and adjustment plug 142. Adjustment plug 142 is in threaded engagement with the valve body and can be rotated by means of projection 145 to advance or retract the plug to increase or decrease the spring force exerted against piston 152.

Preferably the components of the air valve of the embodiment of the invention as shown in FIGS. 11-13 are constructed from plastic materials for economy and smoothness of operation. The preferred materials are Teflon, ABS, nylon, or polyethylene. With these materials, the components of the valve such as the body, valve spool and piston and end plug may be molded, machined or otherwise forced of these plastic materials. The use of plastics generally will eliminate the need for O-rings and when the materials such as those described above are used, the components are basically self-lubricating so that the valve reciprocates smoothly within the valve body.

The admission of supplemental air to support combustion is controlled by position of the valve spool member 150. Valve member 150 is pressure-balanced and shifts in response to pressure changes in the pressure chambers 150 and 152 at either side of the piston. For example, changes in the intake manifold or carburetor vacuum levels will influence the valve causing additional air to be introduced to support combustion during periods of acceleration.

The valve may be calibrated or adjusted at spring 190 to accomodate various engine and operating characteristics. This is accomplished by rotating plug 142 until spring 190 is at the desired compression urging the valve spool toward the closed position. Once the valve spring is at the proper setting, set screw 195 may be adjusted into engagement with the plug to prevent the plug from inadvertent rotation.

In other respects, the operation of the valve is generally as has been described above.

It will be obvious to those skilled in the art to make various modifications, changes and alterations to the air valve of the present invention to the extent that these modifications, changes and alterations do not depart from the spirit and scope of the appended claims, they are intended to be encompassed therein.

I claim:

1. A supplemental air valve for regulating the admission of supplemental combustion air to an internal combustion engine, said valve comprising:
   (a) a valve body defining a bore, at least a portion of said bore defining an air chamber having an inlet and an outlet communicating with said air chamber, said outlet being adapted to be connected to an engine manifold;
   (b) a valve member reciprocal within said bore having a piston member dividing at least a portion of said bore into two pressure chambers, said pressure chambers having means for connection to a source of engine vacuum;
   (c) said valve member being shiftable from an open position permitting ambient air to enter through said inlet to said air chamber and having a closed position blocking admission of air to said air chamber; and
   (d) resilient means normally urging said valve body to said closed position, said resilient means being selectively adjustable to provide a predetermined biasing force on said piston whereby said piston is responsive to changes in engine vacuum to control the admission of supplemental air to said engine.

2. The valve of claim 1 wherein said valve body and valve member are plastic.

3. The valve of claim 2 wherein said plastic is selected from the group of Teflon, ABS, nylon and polyethylene.

4. The valve of claim 1 wherein said bore is internally threaded at one end of said valve body and further including a threaded plug member in engagement with said bore and wherein said resilient means comprises a compression spring extending axially between said valve member and said plug whereby a predetermined biasing force exerted by said spring may be adjusted by advancing or retracting said plug relative to said bore.

* * * * *